(12) United States Patent
Kato

(10) Patent No.: US 11,420,632 B2
(45) Date of Patent: Aug. 23, 2022

(54) OUTPUT DEVICE, CONTROL METHOD, PROGRAM AND STORAGE MEDIUM

(71) Applicant: PIONEER CORPORATION, Tokyo (JP)

(72) Inventor: Masahiro Kato, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 331 days.

(21) Appl. No.: 16/497,747

(22) PCT Filed: Mar. 5, 2018

(86) PCT No.: PCT/JP2018/008340
§ 371 (c)(1),
(2) Date: Sep. 25, 2019

(87) PCT Pub. No.: WO2018/180245
PCT Pub. Date: Oct. 4, 2018

(65) Prior Publication Data
US 2020/0114923 A1    Apr. 16, 2020

(30) Foreign Application Priority Data
Mar. 28, 2017  (JP) .............................. JP2017-062427

(51) Int. Cl.
*B60W 40/02* (2006.01)
*G01S 17/931* (2020.01)
(Continued)

(52) U.S. Cl.
CPC ............. *B60W 40/02* (2013.01); *G01C 21/34* (2013.01); *G01S 17/89* (2013.01); *G01S 17/931* (2020.01)

(58) Field of Classification Search
CPC ...... B60W 40/02; G01S 17/931; G01S 17/89; G01S 17/86; G01C 21/34; G01C 21/1652;
(Continued)

(56) References Cited

U.S. PATENT DOCUMENTS

| 9,719,801 B1* | 8/2017 | Ferguson | .............. G01S 17/931 |
| 2014/0214255 A1* | 7/2014 | Dolgov | ................ G05D 1/0248 701/23 |

(Continued)

FOREIGN PATENT DOCUMENTS

| EP | 3016086 A1 | 5/2016 |
| JP | 2014-048205 A | 3/2014 |

(Continued)

OTHER PUBLICATIONS

Machine Translation JP-5714940-B2 (year:2015).*
(Continued)

*Primary Examiner* — Anne Marie Antonucci
*Assistant Examiner* — Connor L Knight
(74) *Attorney, Agent, or Firm* — Procopio, Cory, Hargreaves & Savitch LLP

(57) ABSTRACT

An autonomous driving control unit 18 of an onboard device 1 acquires the positional accuracies in the travelling direction and the lateral direction of the vehicle, respectively. With reference to map DB 10, the autonomous driving control unit 18 acquires normal line information indicative of the orientation of each feature. The autonomous driving control unit 18 outputs, to an electronic control device of the vehicle, control information for controlling the vehicle to increase the detection accuracy of a target feature which faces a direction, either the travelling direction or the lateral direction of the vehicle, whichever positional accuracy is lower.

11 Claims, 10 Drawing Sheets

(51) Int. Cl.
*G01C 21/34* (2006.01)
*G01S 17/89* (2020.01)

(58) Field of Classification Search
CPC .. G01C 21/3602; G01C 21/26; G01C 11/025; G06K 9/00791; G06K 9/00798; G06K 9/00805; G06K 9/00818; G06K 9/00201; G08G 1/09623; G06T 7/70
See application file for complete search history.

(56) References Cited

U.S. PATENT DOCUMENTS

| | | | |
|---|---|---|---|
| 2015/0110344 A1* | 4/2015 | Okumura | G06K 9/00624 382/103 |
| 2016/0003936 A1* | 1/2016 | Hibino | G01S 13/04 342/27 |
| 2016/0117923 A1* | 4/2016 | Dannenbring | G08G 1/09623 340/905 |
| 2016/0343253 A1 | 11/2016 | Imai | |
| 2017/0069206 A1 | 3/2017 | Dannenbring | |
| 2018/0017683 A1* | 1/2018 | Tateishi | G01S 17/86 |
| 2018/0151066 A1* | 5/2018 | Oba | G01C 21/3407 |
| 2018/0247529 A1 | 8/2018 | Imai | |
| 2018/0365991 A1 | 12/2018 | Yamanoi et al. | |

FOREIGN PATENT DOCUMENTS

| | | |
|---|---|---|
| JP | 2014-169922 A | 9/2014 |
| JP | 5714940 B2 * | 5/2015 |
| JP | 2016-038757 A | 3/2016 |
| WO | 2015/098915 A1 | 7/2015 |
| WO | 2017009933 A1 | 1/2017 |

OTHER PUBLICATIONS

European Search Report for European App. No. 18775296.9 dated Dec. 16, 2020; 8 pages.
International Search Report for Related International Application No. PCT/JP2018/008340, dated May 1, 2018; English translation provided; 4 pages.

* cited by examiner

OUTPUT DEVICE, CONTROL METHOD, PROGRAM AND STORAGE MEDIUM

CROSS-REFERENCE TO RELATED APPLICATIONS

This application is a U.S. National Stage entry of PCT Application No: PCT/JP2018/008340 filed Mar. 5, 2018, which claims priority to Japanese Patent Application No. 2017-062427 filed on Mar. 28, 2017, the contents of which are incorporated herein by reference.

TECHNICAL FIELD

The present invention relates to a technique of controlling a vehicle.

BACKGROUND TECHNIQUE

There is proposed a method of correcting the own vehicle position based on detection results of feature(s) located along a route of the vehicle and detected by use of a radar and/or a camera. Patent Reference 1 discloses a driving support system which guides the vehicle to a position suitable for detecting a feature by use of a radar and/or a camera.

PRIOR ART REFERENCES

Patent References

Patent Reference 1: Japanese Patent Application Laid-Open under No. 2014-048205

SUMMARY OF THE INVENTION

Problem to be Solved by the Invention

Features existing in surroundings of roads are not necessarily provided to face the same direction. Thus, when features in surroundings of roads are used for position estimation, the accuracy of the estimated position could be affected by the difference of the orientations of the features detected by a radar and the like.

The above is an example of issues to be solved by the present invention. It is an object of the present invention to provide an output device suitable for calculating a position with a high degree of accuracy.

Means for Solving the Problem

An invention described in claims is an output device including: a first acquisition unit configured to respectively acquire positional accuracies in a first direction and a second direction defined with respect to a travelling direction of a moving body; a second acquisition unit configured to acquire orientation information indicative of an orientation of each feature, the orientation information being included in map information; and an output unit configured to output control information for controlling the moving body to increase a detection accuracy of a target feature which faces a direction, either the first direction or the second direction, which corresponds to the lower positional accuracy of the positional accuracies.

Another invention described in claims is a control method executed by an output device including: a first acquisition process to respectively acquire positional accuracies in a first direction and a second direction defined with respect to a travelling direction of a moving body; a second acquisition process to acquire orientation information indicative of an orientation of each feature, the orientation information being included in map information; and an output process to output control information for controlling the moving body to increase a detection accuracy of a target feature which faces a direction, either the first direction or the second direction, which corresponds to the lower positional accuracy of the positional accuracies.

Still another invention described in claims is a program executed by an output device, the program causing a computer to function as: a first acquisition unit configured to respectively acquire positional accuracies in a first direction and a second direction defined with respect to a travelling direction of a moving body; a second acquisition unit configured to acquire orientation information indicative of an orientation of each feature, the orientation information being included in map information; and an output unit configured to output control information for controlling the moving body to increase a detection accuracy of a target feature which faces a direction, either the first direction or the second direction, which corresponds to the lower positional accuracy of the positional accuracies.

DETAILED DESCRIPTION OF THE PREFERRED EMBODIMENTS

Figure 1:
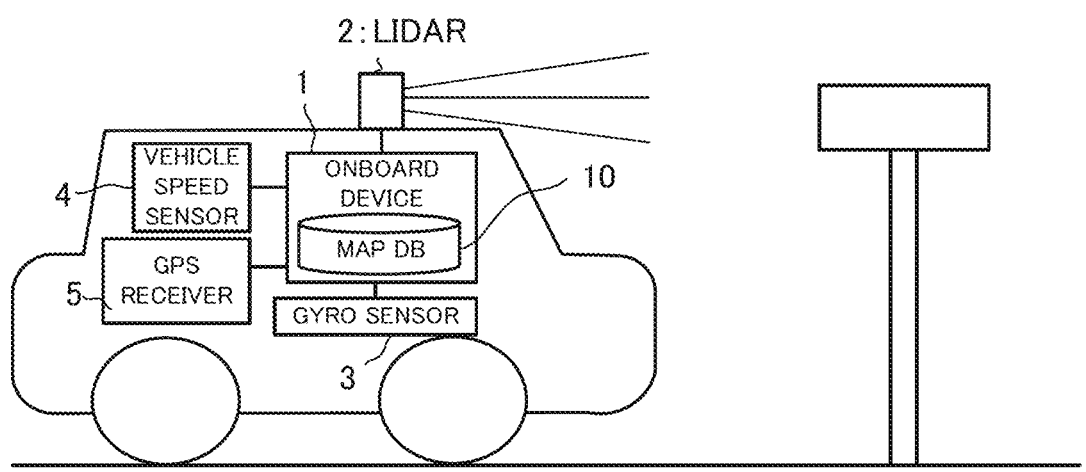
FIG. 1 is a diagram illustrating a schematic configuration of a driving support system.

According to one aspect of the present invention, there is provided an output device including: a first acquisition unit configured to respectively acquire positional accuracies in a first direction and a second direction defined with respect to a travelling direction of a moving body; a second acquisition unit configured to acquire orientation information indicative of an orientation of each feature, the orientation information being included in map information; and an output unit configured to output control information for controlling the moving body to increase a detection accuracy of a target feature which faces a direction, either the first direction or the second direction, which corresponds to the lower positional accuracy of the positional accuracies.

When a position estimation based on detection results of a feature, there is a tendency that the positional accuracy in the direction which the feature faces is high. Thus, according to this mode, the output device controls the moving body so that the detection accuracy of the feature facing the direction in which the positional accuracy is low. Thereby, the output device can suitably increase the positional accuracy in the direction which corresponds to the lower positional accuracy.

In one mode of the above output device, if an angle defined by the direction which corresponds to the lower positional accuracy and an orientation of a feature is equal to or smaller than a predetermined angle, the output unit determines that the feature faces the direction which corresponds to the lower positional accuracy. In some embodiments, the above predetermined angle is set to an angle equal to or smaller than 45 degrees. According to this mode, the output device can control the moving body to suitably increase the positional accuracy in the direction which corresponds to the lower positional accuracy.

In another mode of the above output device, the map information includes information associated with a size of each feature, wherein if there is no feature which faces the direction corresponding to the lower positional accuracy, the output unit determines, on the basis of the information associated with the size of each feature, the target feature whose detection accuracy is to be increased. According to this mode, even when there is no feature which faces the direction which corresponds to the lower positional accuracy, the output device can suitably control the moving body to increase the positional accuracy in the direction which corresponds to the lower positional accuracy.

In still another mode of the above output device, the output device further includes: a third acquisition unit configured to acquire an output of a detection device which detects feature(s) in surroundings of the moving body; a position estimation unit configured to estimate a position of the moving body based on the output regarding the target feature outputted by the detection device and position information regarding the target feature included in the map information. According to this mode, the output device estimates the position with reference to the feature which faces the direction which corresponds to the lower positional accuracy, therefore suitably increasing the positional accuracy in the direction which corresponds to the lower positional accuracy.

In still another mode of the above output device, the output unit outputs the control information for the moving body to move on a lane nearest to the target feature or for the moving body to move on a side near the target feature within a lane where the moving body is currently travelling. According to this mode, the output device controls the moving body to approach the feature facing the direction corresponding to the lower positional accuracy thereby to increase the detection accuracy of the feature.

In still another mode of the above output device, the output unit selects the target feature from feature(s) situated along a route of the moving body. According to this mode, the output device can increase the positional accuracy in the direction corresponding to the lower positional accuracy without substantially changing the route to the destination.

In still another mode of the above output device, the output unit selects, from features situated within a predetermined distance from the moving body as the target feature, such a feature with a smallest angle defined by the direction corresponding to the lower positional accuracy and an orientation of the feature. According to this mode, the output device can control the moving body to increase the positional accuracy in the direction corresponding to the lower positional accuracy.

In still another mode of the above output device, the output unit selects, from features situated within a predetermined distance from the moving body, the target feature based on angles defined by the direction corresponding to the lower positional accuracy and an orientation of each of the features and degrees of suitability of the features as a detection target by a detection device which detects feature (s) in surroundings of the moving body. According to this mode, the output device can accurately estimate the position while increasing the positional accuracy in the direction corresponding to the lower positional accuracy.

In still another mode of the above output device, the output unit selects, as the target feature, a feature with the highest degree of the suitability from such features that angles defined by the direction corresponding to the lower positional accuracy and an orientation of the features is equal to or smaller than a predetermined angle. According to this mode, the output device can accurately estimate the position while increasing the positional accuracy in the direction corresponding to the lower positional accuracy.

According to another aspect of the present invention, there is provided a control method executed by an output device including: a first acquisition process to respectively acquire positional accuracies in a first direction and a second direction defined with respect to a travelling direction of a moving body; a second acquisition process to acquire orientation information indicative of an orientation of each feature, the orientation information being included in map information; and an output process to output control information for controlling the moving body to increase a detection accuracy of a target feature which faces a direction, either the first direction or the second direction, which corresponds to the lower positional accuracy of the positional accuracies. By executing the above control method, the output device can suitably increase the positional accuracy in the direction corresponding to the lower positional accuracy.

According to still another aspect of the present invention, there is provided a program executed by an output device, the program causing a computer to function as: a first acquisition unit configured to respectively acquire positional accuracies in a first direction and a second direction defined with respect to a travelling direction of a moving body; a second acquisition unit configured to acquire orientation information indicative of an orientation of each feature, the orientation information being included in map information; and an output unit configured to output control information for controlling the moving body to increase a detection accuracy of a target feature which faces a direction, either the first direction or the second direction, which corresponds to the lower positional accuracy of the positional accuracies. By executing the above program, the computer can suitably increase the positional accuracy in the direction corresponding to the lower positional accuracy. In some embodiments, the above program is stored on a storage medium.

EMBODIMENTS

A preferred embodiment of the present invention will be described below with reference to the attached drawings.

[Schematic Configuration]

FIG. 1 is a schematic configuration diagram of a driving support system according to the embodiments. The driving support system illustrated in FIG. 1 roughly includes an onboard device 1 loaded on a vehicle, a lidar (Light Detection and Ranging or Laser Illuminated Detection and Ranging) 2, a gyro sensor 3, a vehicle speed sensor 4 and a GPS receiver 5.

The onboard device 1 is electrically connected with the lidar 2, the gyro sensor 3, the vehicle speed sensor 4 and the GPS receiver 5, and estimates the position of the vehicle (referred to as "own vehicle position") on which the onboard device 1 is loaded based on the outputs of those elements. Then, on the basis of the estimation result of the own vehicle position, the onboard device 1 performs autonomous driving control of the vehicle to guide the vehicle along the route to the set destination. The onboard device 1 includes a map DB (DB: Database) 10 which stores road data and feature information which is information related to the features serving as landmarks and provided near roads. The features serving as landmarks may be kilometer posts, 100 m posts, delineators, traffic infrastructure facilities (e.g., road signs, destination boards, traffic signals), telegraph poles, street lamps, which are periodically provided along the side of the road. The feature information includes an index allocated to each feature, position information regarding each feature and information indicative of orientation of each feature in a state that they are associated with each other with respect to each feature. Then, the onboard device 1 estimates the own vehicle position by cross-checking the output of the lidar 2 with the feature information.

The lidar 2 emits pulse lasers within a predetermined angle range in a horizontal direction and a vertical direction to discretely measure the distance to an object existing in an external field, and generates three-dimensional point cloud information indicating the position of the object. In this case, the lidar 2 includes an irradiation unit which irradiates the laser light while changing the irradiation direction, a light receiving unit which receives the reflected light (scattering light) of the irradiated laser light, and an output unit which outputs scan data based on the light receiving signal outputted by the light receiving unit. The scan data is generated based on the irradiation direction corresponding to the laser light received by the light receiving unit and the response delay time of the laser light specified based on the light receiving signal. Generally, the shorter the distance to the target object is, the higher the accuracy of the distance measurement value outputted by the lidar becomes, whereas the longer the distance to the target object is, the lower the above accuracy becomes. In the embodiment, the lidar 2 is mounted toward the traveling direction of the vehicle so as to scan at least the forward area of the vehicle. The lidar 2, the gyro sensor 3, the vehicle speed sensor 4 and the GPS receiver 5 supply the output data to the onboard device 1, respectively. The onboard device 1 is an example of the "output device" according to the present invention and the lidar 2 is an example of the "detection device" according to the present invention.

Figure 2:
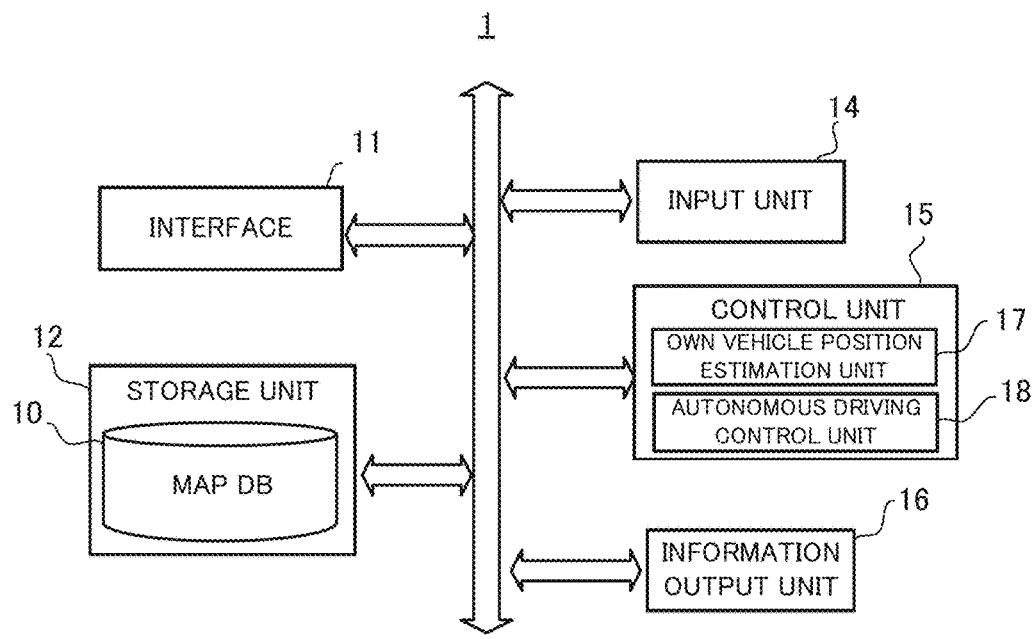
FIG. 2 is a block diagram illustrating a functional configuration of an onboard device.

FIG. 2 is a block diagram illustrating a functional configuration of the onboard device 1. The onboard device 1 mainly includes an interface 11, a storage unit 12, an input unit 14, a control unit 15 and an information output unit 16. These elements are connected with each other by a bus line.

The interface 11 acquires the output data from the sensors such as the lidar 2, the gyro sensor 3, the vehicle speed sensor 4 and the GPS receiver 5, and supplies them to the control unit 15. Also, the interface 11 supplies the signals associated with the driving control of the vehicle, which is generated by the control unit 15, to an ECU (Electronic Control Unit) of the vehicle. A signal which the control unit 15 sends through the interface 11 to the ECU (electronic control device) of the vehicle is an example of the "control information" according to the present invention.

Figure 3:
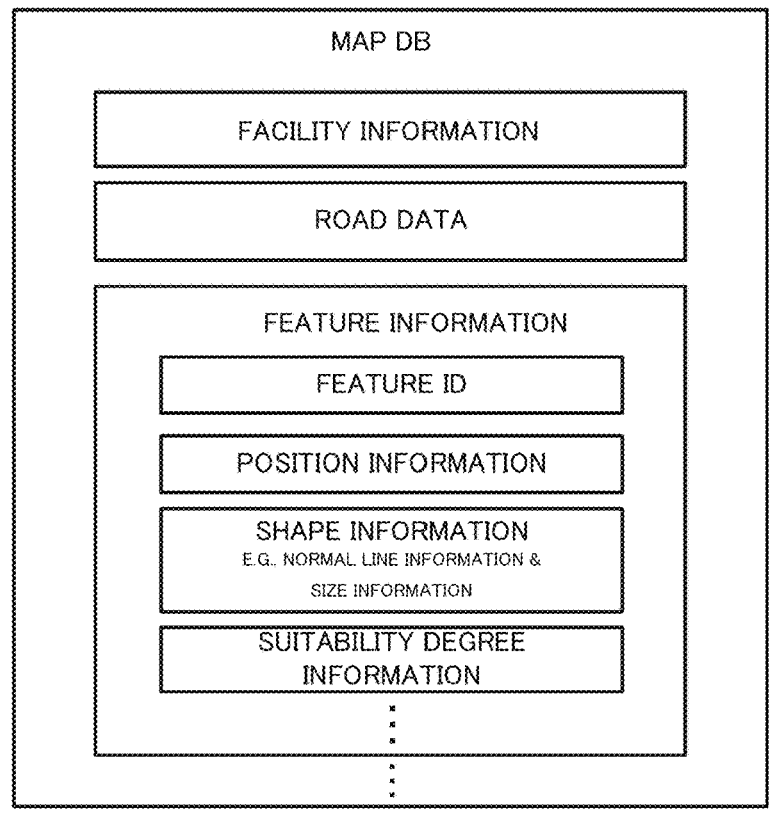
FIG. 3 illustrates an example of the data structure of feature information included in map DB.

The storage unit 12 stores programs executed by the control unit and information necessary for the control unit 15 to execute predetermined processing. In the embodiments, the storage unit 12 stores the map DB 10 including feature information. FIG. 3 illustrates an example of the data structure of the feature information. As illustrated in FIG. 3, the feature information includes feature-related information with respect to each feature, and includes the feature ID which corresponds to the index of each feature, the position information, the shape information and the suitability degree information. The position information indicates the absolute position of the feature expressed by the latitude and the longitude (and the altitude). The shape information is information related to the shape of the feature, and includes the normal line information indicating the orientation of the feature (i.e., the normal direction with respect to the front surface of the feature), and the size information indicating the size of the feature. The suitability degree information indicates the detectability by the lidar 2, i.e., the degree of the suitability of the feature as a measurement target by the lidar 2. The map DB 10 may be regularly updated. In that case, for example, the control unit 15 receives partial map information related to the area where the own vehicle position belongs to, from a server device managing the map information via a communication unit not shown, and reflects the partial map information to the map DB 10.

It is noted that the suitability degree information is predetermined as information indicative of how much each feature is suitable as a measurement target by the lidar 2 and stored as a part of the feature information. Typically, the suitability degree information is information that the suitability is quantified, and is expressed by a value within the range of 0 to 1.0. The suitability degree information regarding the feature(s) corresponding to the highest degree of the suitability indicates 1.0, and the lower the degree of suitability of the feature is, the smaller the value indicated by the suitability degree information becomes.

Some examples will be given of determining the suitability degree information. For example, when a feature is a road sign in a clean state and can be easily detected by the lidar 2, the suitability degree information with respect to the feature is set to 1.0. When a feature is a road sign in a little dirty state and the detection of the feature is a little difficult due to the deterioration of the reflectivity against the laser light from the lidar 2, the suitability degree information is set to 0.8. For a feature situated in the vicinity of trees, the suitability degree information of the feature in winter is set to 0.8 and the suitability degree information of the feature in the other seasons is set to 0.5 in consideration of the possibility of the feature being hidden by the leaves of the trees in spring through autumn. For a feature to which snow can be attached in a snowy weather, the suitability degree information of the feature in a snowy weather is set to 0.1 and the suitability degree information of the feature in the other weather is set to 0.8. For a feature to which a retroreflective coating is not applied or an electronic message board, the suitability degree information is set to a value within the rage of 0.1 to 0.2 because it is often the case that detecting them by the lidar 2 is difficult.

The input unit 14 may be buttons, a touch panel, a remote controller or a voice input device to be operated by a user, and receives an input to designate a destination for the route search or an input designating ON or OFF of the autonomous driving. The information output unit 16 may be a display or a speaker for outputting information based on the control by the control unit 15.

The control unit 15 includes a CPU for executing programs, and controls the entire onboard device 1. In the embodiments, the control unit 15 includes an own vehicle position estimation unit 17, and an autonomous driving control unit 18. The control unit 15 is an example of the "first acquisition unit", "second acquisition unit", "third acquisition unit", "position estimation unit", "output unit" and "computer" which executes a program according to the present invention.

The own vehicle position estimation unit 17 corrects the own vehicle position estimated from the output data of the gyro sensor 3, the vehicle speed sensor 4 and/or the GPS receiver 5 based on the measurement values of the distance and the angle with respect to the feature measured by the lidar 2 and the position information of the feature extracted from the map DB 10. In the embodiments, as an example, the own vehicle position estimation unit 17 alternately executes a prediction step that is a process to estimate the own vehicle position from the output data of the gyro sensor 3 and the vehicle speed sensor 4, etc., by a state estimation method based on Bayesian inference, and a measurement updating step that is a process to correct the estimated value of the own vehicle position calculated in the preceding prediction step.

The autonomous driving control unit 18 refers to the map DB 10, and transmits signals necessary for the autonomous driving control to the vehicle based on the set route and the own vehicle position estimated by the own vehicle position estimation unit 17. The autonomous driving control unit 18 sets a target track based on the set route, and controls the position of the vehicle by transmitting the guide signal to the vehicle such that the own vehicle position estimated by the own vehicle position estimation unit 17 stays within a deviation width smaller than a predetermined width from the target track. According to the embodiment, the autonomous driving control unit 18 monitors the accuracy of the position estimated by the own vehicle position estimation unit 17 in the travelling direction and the accuracy of the position estimated by the own vehicle position estimation unit 17 in the direction (referred to as "lateral direction") perpendicular to the travelling direction. Then, the autonomous driving control unit 18 corrects the target track so as to increase the accuracy of detecting, by the lidar 2, such a feature that is suitable for increasing the accuracy of the estimated position in the direction (referred to as "low positional accuracy direction Dtag"), either the travelling direction or the lateral direction, whichever accuracy of the estimated position is lower. The travelling direction and the lateral direction of the vehicle are examples of the "first direction" and the "second direction" according to the present invention.

A supplementary explanation will be given of the process of estimating the own vehicle position by the own vehicle position estimation unit 17. The own vehicle position estimation unit 17 successively repeats the prediction step and the measurement updating step to perform the own vehicle position estimation. The state estimation filter used in those steps may be various filters developed to perform the Bayesian inference, for example, an extended Kalman filter, an unscented Kalman filter and a particle filter. Thus, as the position estimation based on the Bayesian inference, various methods are proposed. In the following, as an example, the own vehicle position estimation using the extended Kalman filter will be briefly described.

Figure 4:
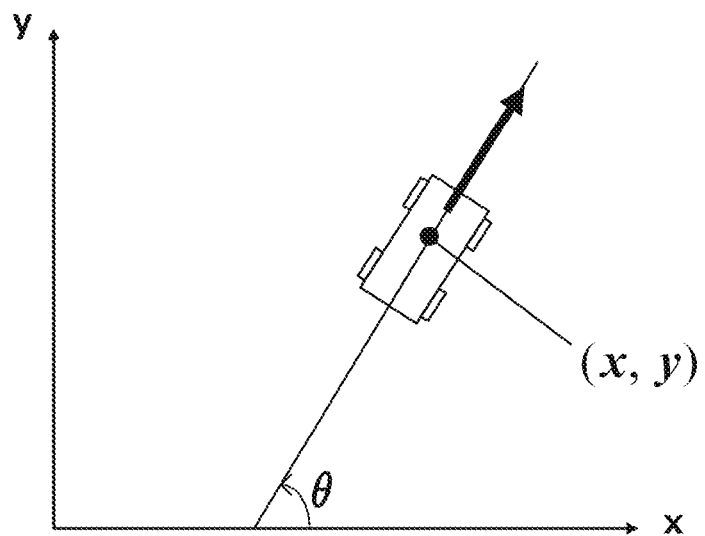
FIG. 4 is a diagram expressing a state variable vector on two-dimensional rectangular coordinates.

FIG. 4 is a diagram expressing a state variable vector X on two-dimensional rectangular coordinates. In the first embodiment, the z-coordinate is projected on the xy-two-dimensional rectangular coordinates. As shown in FIG. 4, the own vehicle position on the plane defined on the xy-two-dimensional rectangular coordinates is expressed by the coordinates "(x, y)" and the azimuth "θ" of the own vehicle. Here, the azimuth θ is defined as an angle formed by the traveling direction of the vehicle and the x-axis. The coordinates (x, y) indicate an absolute position corresponding to the combination of the latitude and the longitude, for example.

Figure 5:
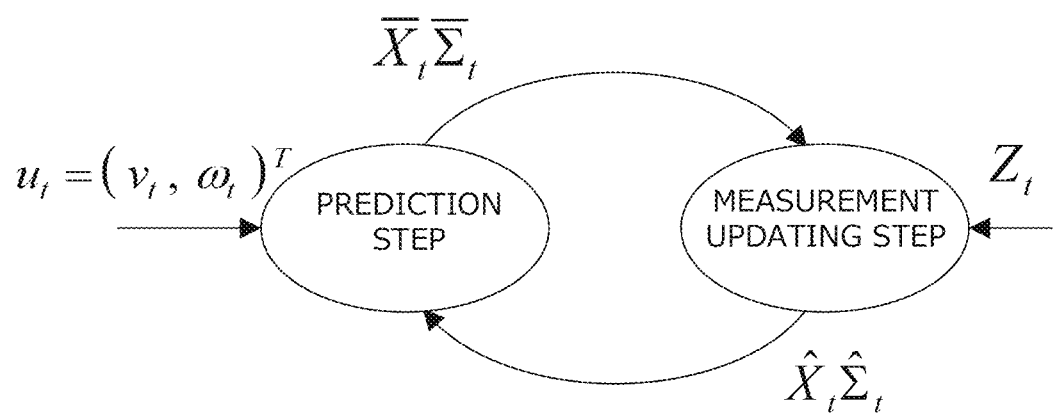
FIG. 5 is a diagram illustrating a schematic relation of a prediction step and a measurement updating step.

FIG. 5 is a diagram illustrating a schematic relation of the prediction step and the measurement updating step. As shown in FIG. 5, by repeating the prediction step and the measurement updating step, calculation and updating of the estimated value of the state variable vector X are successively performed. Here, the state variable vector of the reference time (i.e., current time) "t" subjected to the calculation is expressed as "$X^-_t$" or "$X^\wedge_t$". Hereinafter, the state variable vector is expressed as "$X_t=(x_t, y_t, \theta_t^T)$". It is noted that a subscript "−" is put to the provisional prediction value predicted by the prediction step, and a subscript "^" is put to the higher-accuracy estimation value updated by the measurement updating step.

At the prediction step, by applying the moving speed "v" of the vehicle and the angular rate "ω" (which are collectively expressed hereinafter as "control value $u_t=(v_t, \omega_t)^T$") to the state variable vector $X^\wedge_{t-1}$ at the time t−1; calculated at the last measurement updating step, the own position estimator 17 calculates an estimated value (referred to as "prior estimated value") $X^-_t$ of the own vehicle position at the time t. At the same time, the own position estimator 17 calculates, from a covariance matrix "$\Sigma^\wedge_{t-1}$" calculated at the time t−1 of the last measurement updating step, a covariance matrix "$\Sigma^-_t$" corresponding to the error distribution of the prior estimated value $X^-_t$.

At the measurement updating step, the own vehicle position estimation unit 17 associates the position vector of a feature registered in the map DB 10 and the scan data of the lidar 2. Then, when they are associated, the own vehicle position estimation unit 17 acquires the measurement value (hereinafter referred to as "measurement value") "$Z_t$" of the associated feature by the lidar 2 and the estimated measurement value "$Z^\wedge_t$" of the feature acquired by modeling the measurement processing by the lidar 2 using the prior estimated value $X^-_t$ and the position vector of the feature registered in the map DB 10, respectively. The measurement value $Z_t$ is a two-dimensional vector indicating the distance and the scan angle of the feature measured at the time t by the lidar 2. Then, the own vehicle position estimation unit 17 multiples the difference between the measurement value $Z_t$ and the estimated measurement value $Z^\wedge_t$ by a Kalman gain "$K_t$" and add it to the prior estimated value $X^-_t$. Thereby, as indicated by the following equation (1), the own vehicle position estimation unit 17 calculates the updated state variable vector (referred to as "post estimated value") $X^\wedge_t$.

$$X^{\wedge}{}_t = X^{-}{}_t + K_t(Z_t - Z^{-}{}_t) \quad (1)$$

At the measurement updating step, in the same way as the prediction step, the own vehicle position estimation unit 17 calculates, from the prior covariance matrix $\Sigma^{-}{}_t$, a covariance matrix $\Sigma^{\wedge}{}_t$ corresponding to the error distribution of the post estimated value $X^{\wedge}{}_t$. The parameters such as Kalman gain $K_t$ can be calculated in the same way as a known own-position estimation method using an extended Kalman filter.

It is noted that at the time when the own vehicle position estimation unit 17 can associate the position vector of multiple features registered in the map DB 10 and the scan data of the lidar 2, the own vehicle position estimation unit 17 may perform the measurement updating step based on the measurement value of any one feature (e.g., target feature Ltag to be mentioned later) selected from the multiple feature or may perform the measurement updating step multiple times based on the measurement values of all the multiple features associated. In the case of using the measurement values of the multiple feature, the own vehicle position estimation unit 17 may weight each of the features so that the weight on a feature decreases with increasing distance between the lidar 2 and the feature considering the fact that the measurement error of the feature by the lidar 2 increases with increasing distance between the feature and the lidar 2.

As described later, the autonomous driving control unit 18 determines the low positional accuracy direction Dtag and corrects the target track of the vehicle so as to increase the accuracy of the estimated position in the low positional accuracy direction Dtag.

[Vehicle Control Based on Accuracy of Estimated Position]

(1) Process Flow

Figure 6:
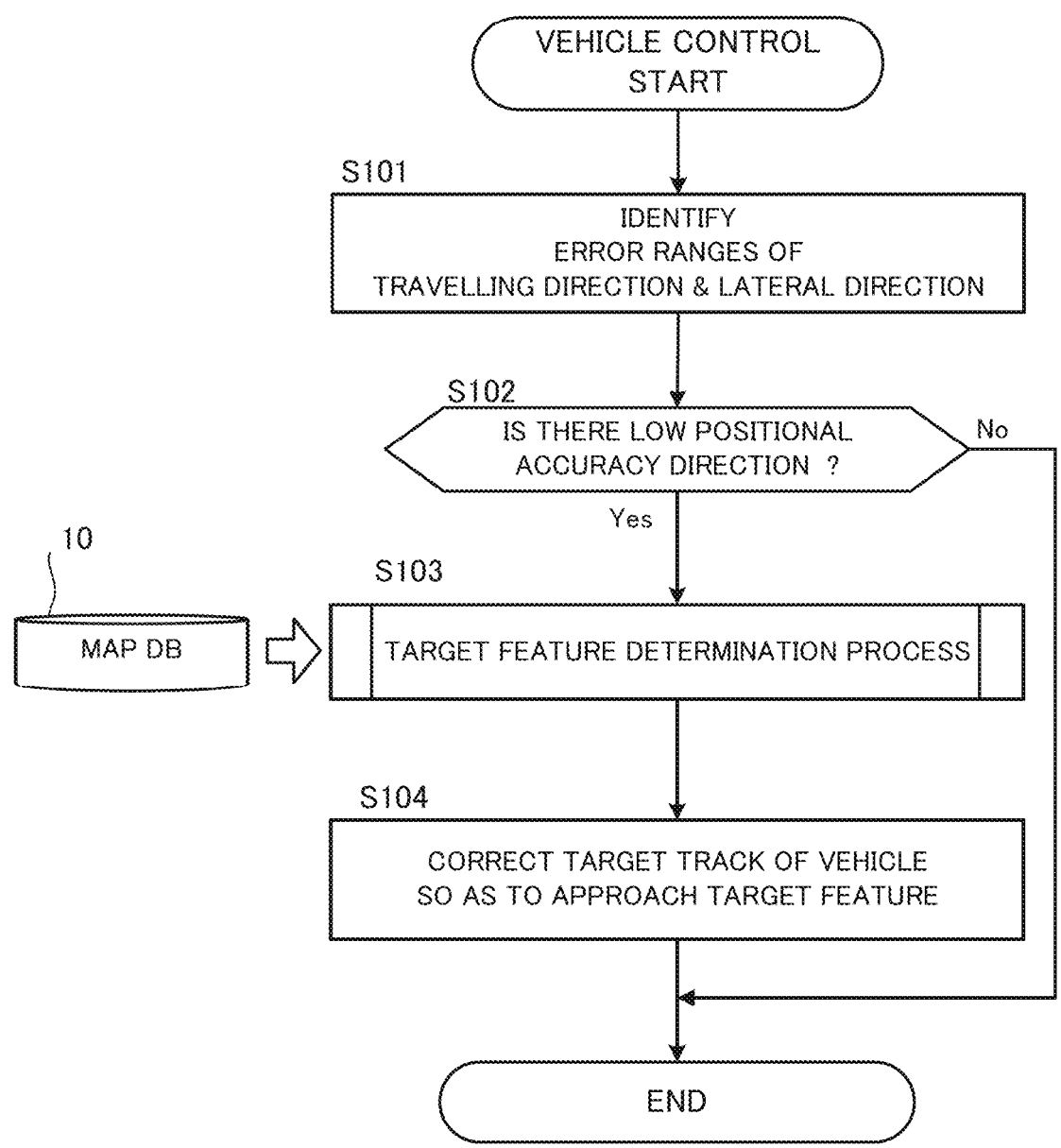
FIG. 6 illustrates a flowchart indicating the vehicle control based on the accuracy of the estimated position.

FIG. 6 is a flowchart indicating the vehicle control executed by the autonomous driving control unit 18 based on the accuracy of the estimated position according to the embodiment. According to the flowchart in FIG. 6, at the time when the low positional accuracy direction Dtag is detected, the autonomous driving control unit 18 determines a feature (referred to as "target feature Ltag") which is suitable for increasing the accuracy of the estimated position in the low positional accuracy direction Dtag and controls the vehicle so as to approach the target feature Ltag. It is noted that the autonomous driving control unit 18 has already set the target track of the vehicle along the route to the set destination by the time of the beginning of the execution of the flowchart in FIG. 6.

First, the autonomous driving control unit 18 identifies the error ranges of estimated position in the travelling direction and in the lateral direction of the vehicle (step S101). For example, the autonomous driving control unit 18 identifies the error ranges of estimated position in the travelling direction and in the lateral direction of the vehicle, respectively, by converting a covariance matrix of the error, which is acquired in the calculation process of the estimated position based on the extended Kalman filter, through a rotation matrix in which the azimuth θ of the own vehicle is used.

Next, the autonomous driving control unit 18 determines whether or not there is a low positional accuracy direction Dtag (step S102). For example, when either one of the error ranges, identified at step S101, of the estimated position in the travelling direction or in the lateral direction is longer than a threshold, the autonomous driving control unit 18 identifies the direction whose error range is longer than the threshold as the low positional accuracy direction Dtag. Instead of making a determination at step S102, the autonomous driving control unit 18 may compare the length of the error range of the estimated position in the travelling direction of the vehicle with the length of the error range of the estimated position in the lateral direction of the vehicle and determine the direction corresponding to the longer error range as the low positional accuracy direction Dtag. In this case, the autonomous driving control unit 18 performs the process step S103 after the identification of the low positional accuracy direction Dtag.

When determining that there is a low positional accuracy direction Dtag (step S102; Yes), the autonomous driving control unit 18 performs the target feature determination process, in which the autonomous driving control unit 18 determines, as the target feature Ltag with reference to the map DB 10, a feature that is situated along the route and suitable for increasing the accuracy of the estimated position.

Figure 12:
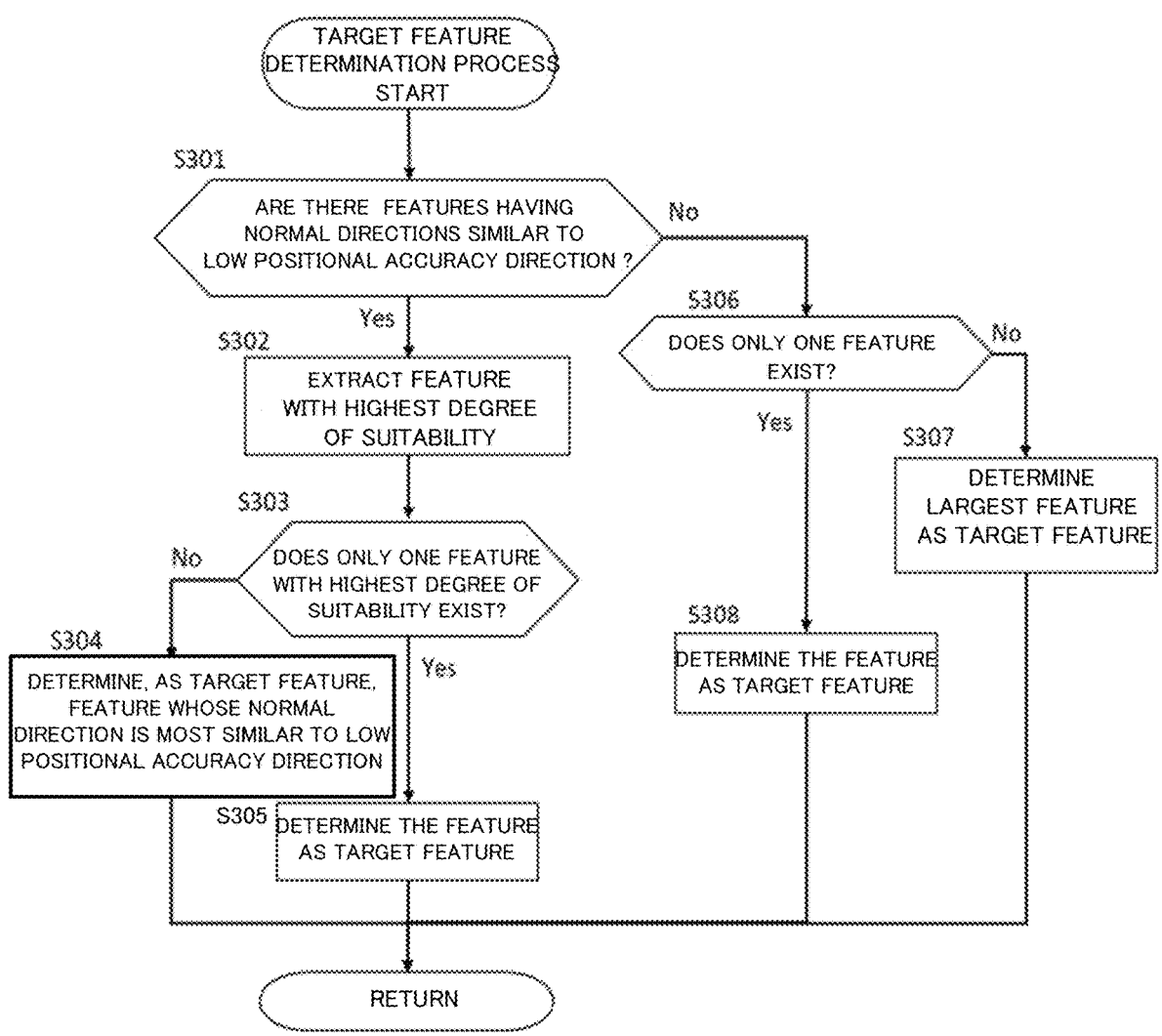
FIG. 12 is a flowchart indicative of target feature determination process.

Here, with reference to FIG. 12, a description will be given of the target feature determination process at step S103. FIG. 12 is a flowchart indicating the target feature determination process executed at the step S103 in FIG. 6 according to the embodiment. According to the flowchart in FIG. 12, with reference to the map DB 10, from features situated along the route within a predetermined distance therefrom and having the normal direction similar to (within a predetermined angle difference from) the low positional accuracy direction Dtag, the autonomous driving control unit 18 selects, as the target feature Ltag, such a feature having a high degree of the suitability as a the measurement target by the lidar 2 and having the normal direction whose angle difference from the low positional accuracy direction Dtag is small. For example, the above-mentioned predetermined angle difference is set to an angle smaller than 45 degree. In this case, such a feature having the normal direction whose angle difference from the low positional accuracy direction Dtag is smaller than 45 degree is considered as the feature having the normal direction similar to the low positional accuracy direction Dtag.

A supplementary explanation of step S103 will be given below. As mentioned later, when the orientation (i.e., normal direction) of the surface irradiated with the laser light of the lidar 2 is parallel to the laser light of the lidar 2, it is possible to increase the accuracy of the estimated position in that direction. Thus, the accuracy of the estimated position in the low positional accuracy direction Dtag by use of a feature increases with decreasing angle difference between the low positional accuracy direction Dtag and the normal direction of the feature.

First, at the time of starting the target feature determination process at step S103, the autonomous driving control unit 18 determines whether or not there are multiple features having the normal directions similar to (i.e., within a predetermined angle difference from) the low positional accuracy direction Dtag among features that are registered in the map DB 10 and that are measurable by the lidar 2 from the route (step S301). Then, when determining that there are multiple features having the normal directions similar to the low positional accuracy direction Dtag among the features (step S301; Yes), the autonomous driving control unit 18 extracts, from the multiple features, the feature(s) with the highest degree of the suitability as a measurement target by the lidar 2 (step S302). For example, with reference to suitability degree information corresponding to the features whose normal directions are determined to be within a predetermined angle difference therefrom at step 301, the autonomous driving control unit 18 extracts the feature(s) corresponding to the suitability degree information indicative of the highest degree of the suitability.

Next, the autonomous driving control unit 18 determines whether or not there is only one feature with the highest degree of the suitability (step S303). Namely, the autonomous driving control unit 18 determines whether or not features with the same degree of the suitability are extracted at step S302. Then, when determining that there is only one feature with the highest degree of the suitability (step S303; Yes), the autonomous driving control unit 18 determines the only one feature extracted at step S302 as the target feature Ltag and proceeds with step S104. In contrast, when the autonomous driving control unit 18 does not determine that there is only one feature with the highest degree of the suitability (step S303; No), the autonomous driving control unit 18 selects, as the target feature Ltag, the feature having the normal direction most similar to the low positional accuracy direction Dtag from the multiple features extracted at step S301 and proceeds with step S104.

When the autonomous driving control unit 18 does not determine that there are multiple features having the normal directions within the predetermined angle difference from the low positional accuracy direction Dtag (step S301; No), the autonomous driving control unit 18 determines whether or not there is only one feature having the normal direction within the predetermined angle difference from the low positional accuracy direction Dtag (step S306). When the autonomous driving control unit 18 determines that there is no feature having the normal direction within the predetermined angle difference from the low positional accuracy direction Dtag (step S306; No), the autonomous driving control unit 18 refers to the map DB 10 and extracts the size information of feature(s) situated along the route within a predetermined distance thereby to determine the largest feature among the feature(s) as the target feature Ltag (step S307). In contrast, when the autonomous driving control unit 18 determines that there is one feature having the normal direction within the predetermined angle difference from the low positional accuracy direction Dtag (step S306; Yes), the autonomous driving control unit 18 determines the feature as the target feature Ltag (step S308) and proceeds with step S104.

According to the above explanation, the autonomous driving control unit 18 determines as the target feature Ltag such a feature having the normal direction most similar to the target feature Ltag among features having the normal direction whose angle difference from the low positional accuracy direction Dtag is within a predetermined angle difference and having the highest degree of the suitability. However, the determination approach of the target feature Ltag is not limited to the above approach. For example, when there are multiple features having the normal directions whose angle difference from the low positional accuracy direction Dtag are very small, the autonomous driving control unit 18 may determine the feature having the highest degree of the suitability as the target feature Ltag among the multiple features. In another example, the autonomous driving control unit 18 converts the angle difference between the low positional accuracy direction Dtag and the normal direction and the degree of the suitability of each feature into scores through predetermined algorithms, respectively. Then, on the basis of the score of the angle difference and the score of the degree of the suitability, the autonomous driving control unit 18 comprehensively determines, as the target feature Ltag, such a feature suitable for increasing the accuracy of the estimated position in the low positional accuracy direction Dtag. If the suitability degree information is not registered in the feature information in the map DB 10, the autonomous driving control unit 18 may determine, as the target feature Ltag, the feature having the normal direction whose angle difference from the low positional accuracy direction Dtag is the smallest.

Above things considered, the autonomous driving control unit 18 determines, as the target feature Ltag, such a feature having the normal direction similar to the low positional accuracy direction Dtag among features registered in the map DB 10 and measurable by the lidar 2 on the route. In this case, the autonomous driving control unit 18 identifies the normal direction of each feature based on the normal line information associated with each feature registered in the feature information in the map DB 10. Then, for example, among features situated along the route within a predetermined distance, the autonomous driving control unit 18 determines, as the target feature Ltag, such a feature having the normal direction most similar (closest) to the low positional accuracy direction Dtag, or, such a feature having the highest degree of the suitability as an object subjected to measurement by the lidar 2 and having the normal direction whose angle difference from the low positional accuracy direction Dtag is within a predetermined range. If there is no feature along the route having the normal direction similar to the low positional accuracy direction Dtag, the autonomous driving control unit 18 determines the target feature Ltag with reference to the size information in the feature information. Examples of the specific determination on the target feature Ltag will be described in the section "(3) Specific Example".

Then, the autonomous driving control unit 18 corrects the target track of the vehicle so as to approach the target feature Ltag determined at step S103 (step S104). Specifically, the autonomous driving control unit 18 corrects the target track to change lanes to a lane closest to the target feature Ltag or corrects the target track to shift the travelling position to approach the target feature Ltag within the lane where the vehicle is travelling. In these ways, the autonomous driving control unit 18 makes the vehicle approach the target feature Ltag, thereby increasing the detection accuracy of the target feature Ltag by the lidar 2 and increasing the accuracy of the estimated position in the low positional accuracy direction Dtag. Even in such a case that the position estimation is performed based on multiple features through weighting each of the multiple feature depending on the distance between each of the multiple feature and the vehicle, the autonomous driving control unit 18 makes the vehicle approach the target feature Ltag thereby to relatively increase the weight on the target feature Ltag.

In contrast, at step S102, when the autonomous driving control unit 18 determines that there is no low positional accuracy direction Dtag (step S102; No), the autonomous driving control unit 18 determines that there is no need to correct the target track of the vehicle. Then, the autonomous driving control unit 18 ends the process of the flowchart.

(2) Relation Between Normal Direction of Feature and Accuracy of Estimated Position Next, a description will be given of the relation between the normal direction of the feature and the accuracy of the estimated position. As described below, as the normal direction of the surface of the feature irradiated with laser light by the lidar 2 is close to parallel with the laser light by the lidar 2, it is possible to increase the accuracy of the estimated position in that direction.

Figure 7A:
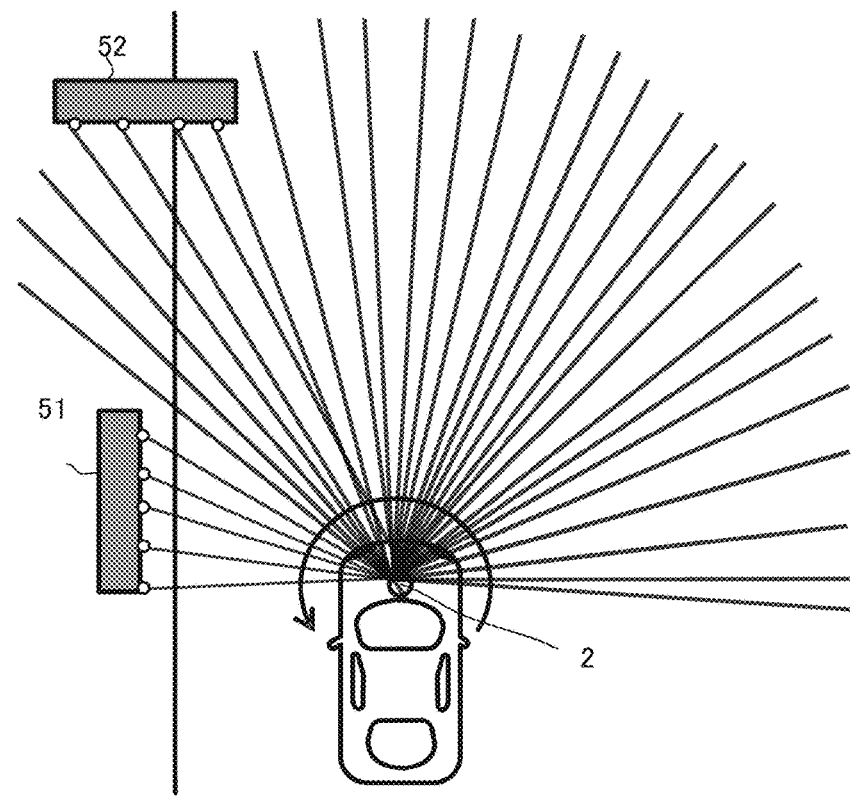
FIG. 7A illustrates a plane view of the vehicle which is performing scans by a lidar.
Figure 7B:
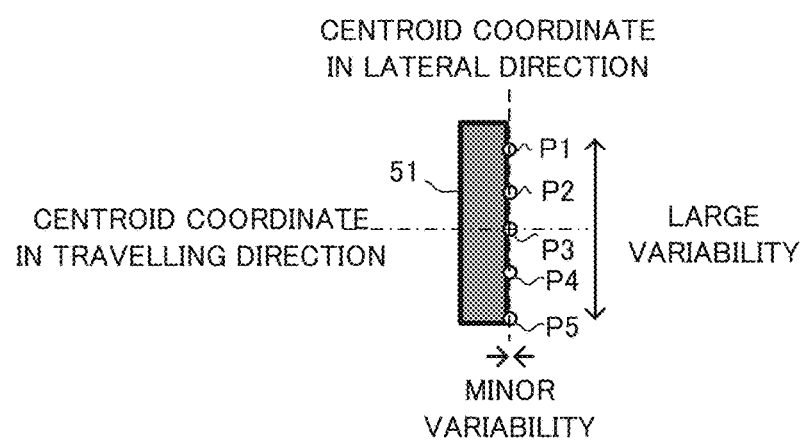
FIGS. 7B and 7C illustrate enlarged views of features along with the points irradiated with the laser lights.
Figure 7C:
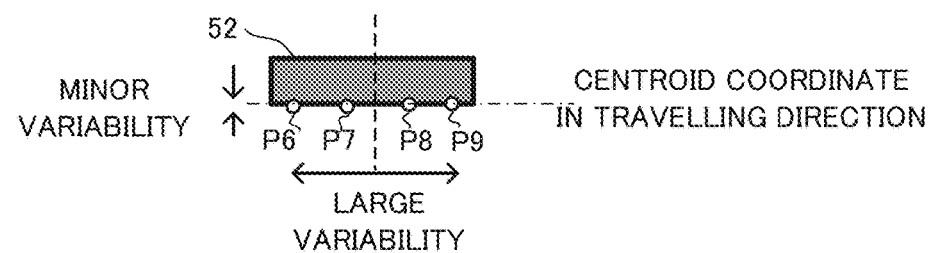

FIG. 7A illustrates a plane view of the vehicle which is performing scans by the lidar 2. In FIG. 7A, within the range of measurement by the lidar 2, there are a feature 51 and a feature 52 whose normal directions are different. FIG. 7B illustrates an enlarged view of the feature 51 along with the points "P1" to "P5" irradiated with the laser lights by the lidar 2. FIG. 7C illustrates an enlarged view of the feature 52 along with the points "P6" to "P9" irradiated with the laser lights by the lidar 2. FIGS. 7B and 7C illustrate by dashed lines the centroid coordinates, calculated from the coordinates of the positions of the irradiated points, in the lateral direction and the travelling direction of the vehicle. For the purpose of explanation, though FIGS. 7A to 7C illustrates such a case that the lidar 2 radiates the laser light along a predetermined scan plane, the lidar 2 may radiate the laser light along multiple scan planes with different heights.

As illustrated in FIGS. 7A and 7B, the normal direction of the feature 51 substantially coincides with the lateral direction of the vehicle. Thus, the irradiated points P1 to P5 are arranged along the travelling direction of the vehicle. As a result, there is a large variability in the travelling direction and there is a minor variability in the lateral direction therein. When determining the measurement position (the measurement value Z in FIG. 5) of the feature through the position estimation process by use of the lidar 2, the autonomous driving control unit 18 calculates the two-dimensional centroid coordinate, with respect to the vehicle, of the target feature calculated with the point cloud data of the target feature. Thus, for the position estimation by use of the feature 51, the accuracy of the estimated position in the lateral direction where the variability in the irradiated points P1 to P5 is small is likely to be high. Thus, the autonomous driving control unit 18 determines the feature 51 as the target feature Ltag if the lateral direction is the low positional accuracy direction Dtag.

In contrast, as illustrated in FIGS. 7A and 7C, the normal direction of the feature 52 substantially coincides with the travelling direction of the vehicle. Thus, the irradiated points P6 to P9 are arranged along the lateral direction of the vehicle. As a result, there is a large variability in the lateral direction in the irradiated points P6 to P9 and there is a minor variability in the travelling direction therein. Thus, for the position estimation by use of the feature 52, the accuracy of the estimated position in the travelling direction where the variability in the irradiated points P6 to P9 is small is likely to be high. Thus, the autonomous driving control unit 18 determines the feature 52 as the target feature Ltag if the travelling direction is the low positional accuracy direction Dtag.

In these ways, as the normal direction of the surface of the feature irradiated with laser light by the lidar 2 is close to parallel with the laser light by the lidar 2, it is possible to increase the accuracy of the estimated position in the normal direction. Thus, at step S103 in FIG. 6, the autonomous driving control unit 18 determines as the target feature Ltag such a feature, situated along the route and having the normal direction similar to the low positional accuracy direction Dtag.

(3) Specific Example

Next, a description will be given with reference to FIGS. 8 to 11 of specific examples based on the process indicated by the flowchart in FIG. 6.

Figure 8:
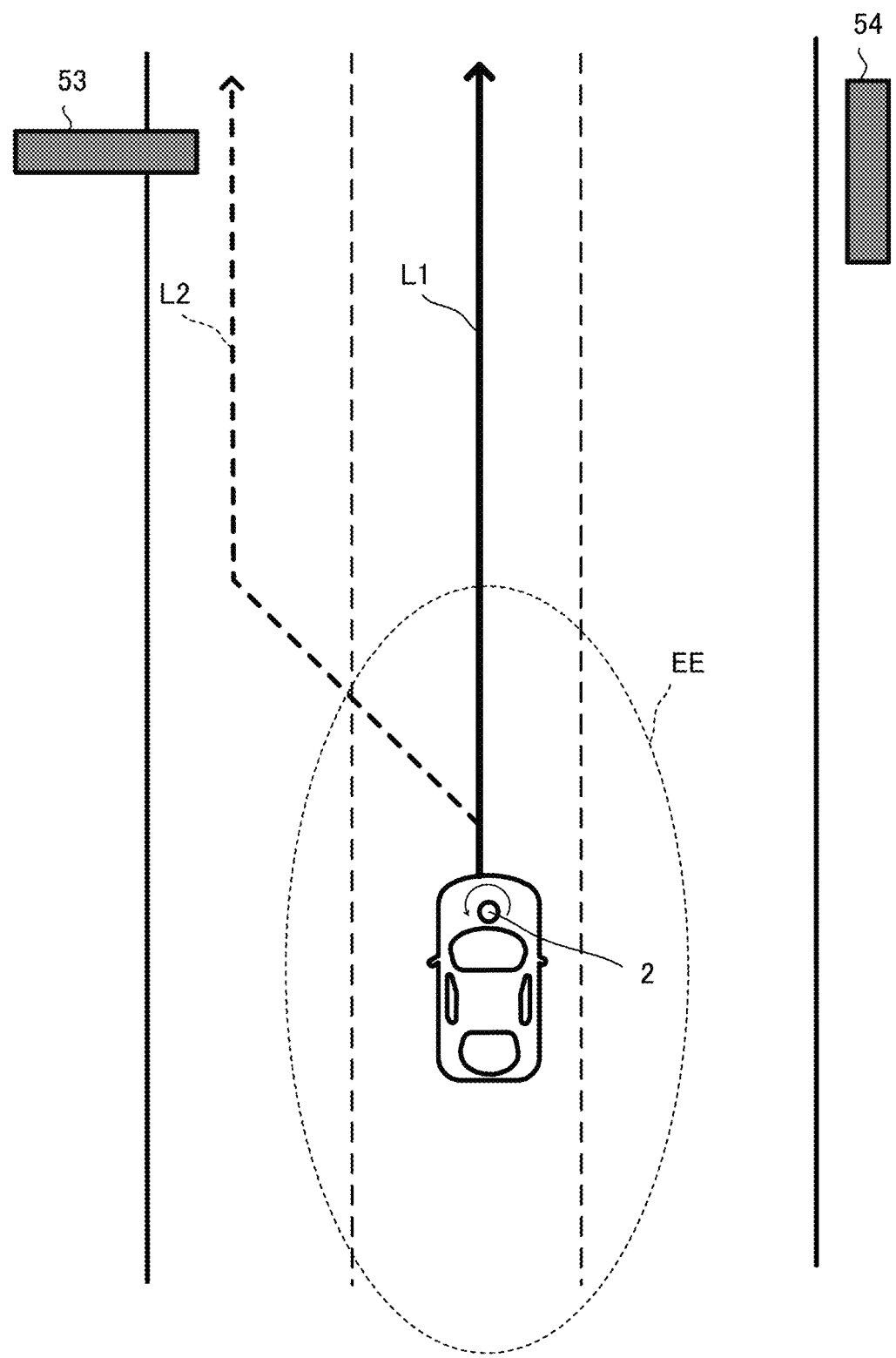
FIG. 8 illustrates a plane view of the vehicle in a case where there are features located on the left-front position and on the right-front position of a road with three lanes on each side.

FIG. 8 illustrates a plane view of the vehicle in a case where there is a feature 53 located on the left-front position of a road with three lanes on each side and frontally facing the vehicle and where there is a feature 54 located on the right-front position of the road and laterally facing the vehicle. In FIGS. 8 to 11, the solid arrow "L1" indicates the target track before the execution of the flowchart in FIG. 6 and the solid arrow "L2" indicates the target track after the execution of the flowchart in FIG. 6. The dashed ellipse "EE" indicates an error ellipse corresponding to the range of the error of the estimated position.

According to the example illustrated in FIG. 8, the range of the error in the travelling direction of the vehicle indicated by the dashed ellipse EE is longer than the range in the lateral direction of the vehicle and is longer than a predetermined threshold. In this case, at step S102 of the flowchart in FIG. 6, the autonomous driving control unit 18 determines the travelling direction as the low positional accuracy direction Dtag. Then, at step S103, with reference to the map DB 10, the autonomous driving control unit 18 selects, from features existing within a predetermined distance along the route, as the target feature Ltag, the feature 53 having the normal direction similar to the travelling direction that is the low positional accuracy direction Dtag. Then, at step S104, the autonomous driving control unit 18 changes the target track so that the vehicle changes lanes from the center lane of the road to the left side lane near the feature 53. Thereby, the vehicle goes past the feature 53 by using the left side lane which is the nearest lane to the feature 53. Thus, the onboard device 1 can detect the feature 53 by the lidar 2 with a high degree of accuracy, therefore increasing the accuracy of the estimated position in the travelling direction that is the low positional accuracy direction Dtag.

Figure 9:
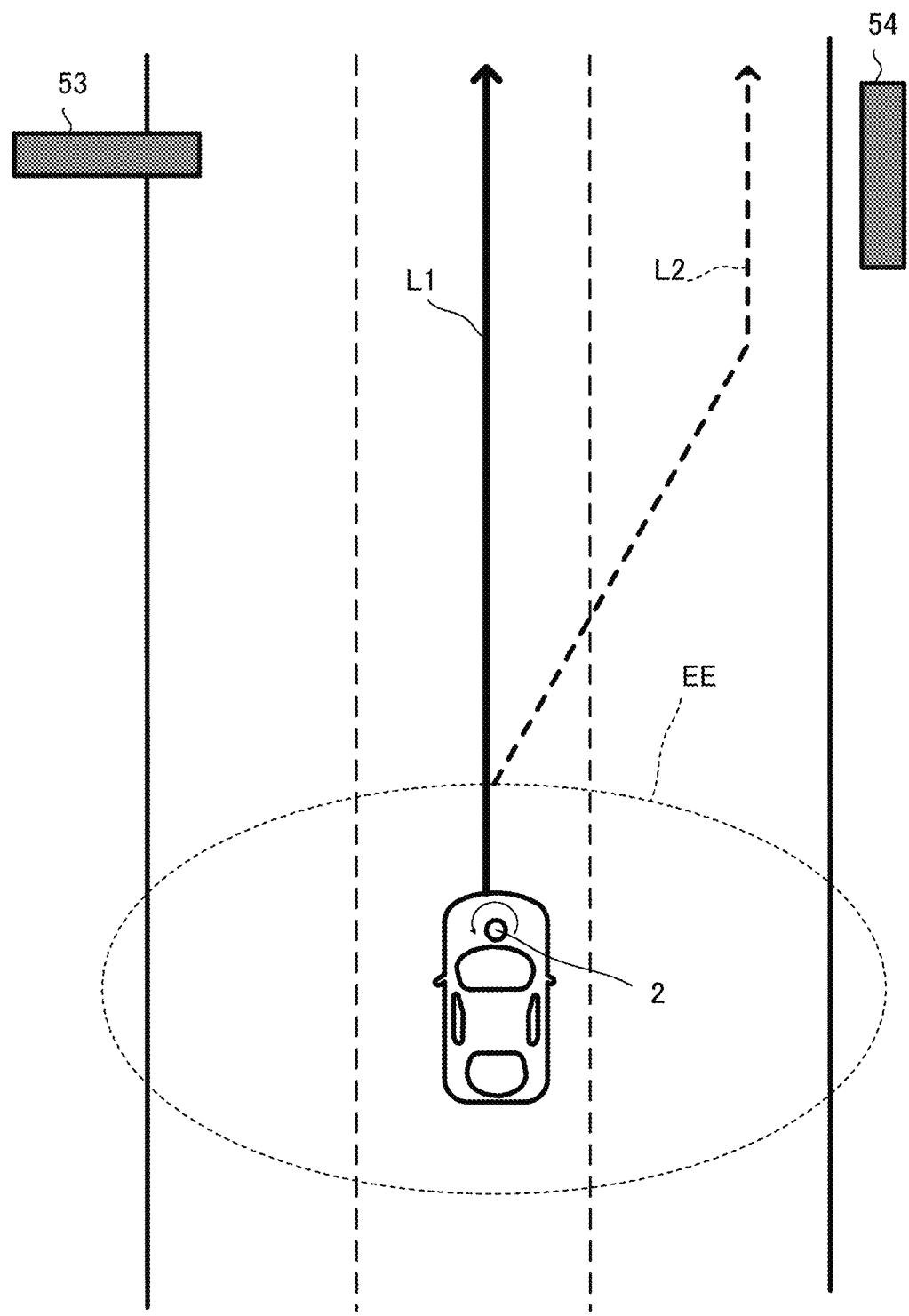
FIG. 9 illustrates a plane view of the vehicle in a case where the accuracy of the estimated position in the lateral direction of the vehicle is lower than the accuracy in the travelling direction thereof.

FIG. 9 illustrates a plane view of the vehicle in a case where the vehicle is travelling on the road illustrated in FIG. 8 and where the accuracy of the estimated position in the lateral direction of the vehicle is lower than the accuracy in the travelling direction thereof.

In this case, at step S102 of the flowchart in FIG. 6, the autonomous driving control unit 18 determines the lateral direction as the low positional accuracy direction Dtag. Then, at step S103, with reference to the map DB 10, the autonomous driving control unit 18 selects, as the target feature Ltag, the feature 54 having the normal direction similar to the lateral direction that is the low positional accuracy direction Dtag from features existing within a predetermined distance along the route. Then, at step S104, the autonomous driving control unit 18 changes the target track so that the vehicle changes lanes from the center lane of the road to the right-side lane near the feature 54. Thereby, the vehicle goes past the feature 54 by using the right-side lane which is the nearest lane to the feature 54. Thus, the onboard device 1 can detect the feature 54 by the lidar 2 with a high degree of accuracy, therefore increasing the accuracy of the estimated position in the lateral direction that is the low positional accuracy direction Dtag.

Figure 10:
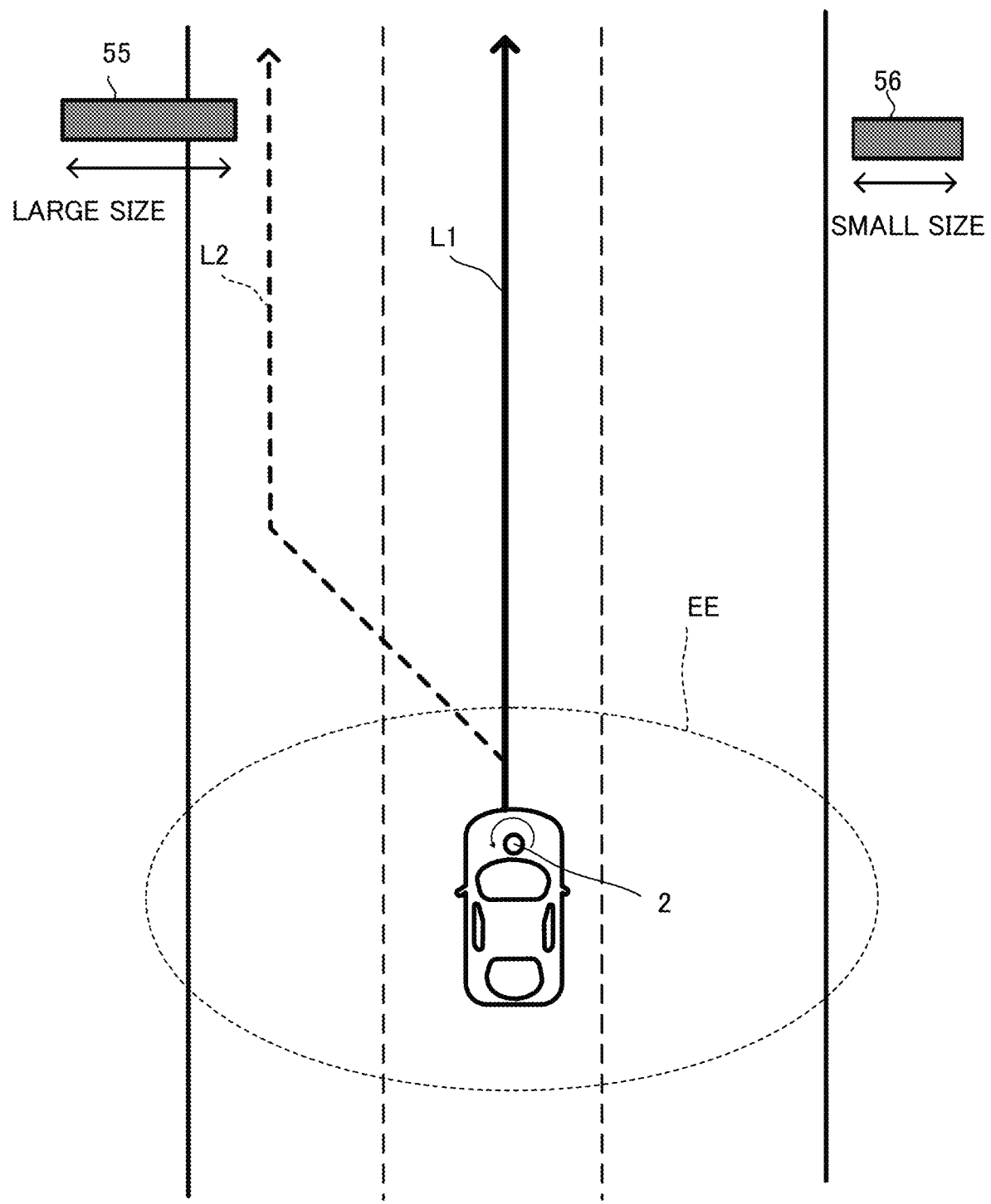
FIG. 10 illustrates a plane view of the vehicle in a case where there are features, on the left-front position and on the right-front position, whose normal directions are substantially identical.

FIG. 10 illustrates a plane view of the vehicle in a case where there is no feature, along the road, having the normal direction similar to the low positional accuracy direction Dtag. According to the example illustrated in FIG. 10, the normal directions of both of the features 55 and 56 situated along the route within a predetermined distance are substantially perpendicular to the low positional accuracy direction Dtag.

In this case, at step S102 of the flowchart in FIG. 6, the autonomous driving control unit 18 determines the lateral direction as the low positional accuracy direction Dtag.

Then, at step S103, with reference to the map DB 10, the autonomous driving control unit 18 determines that there is no feature having the normal direction similar to the low positional accuracy direction Dtag among features existing within a predetermined distance along the route. In this case, the autonomous driving control unit 18 extracts and refers to the size information of the feature 55 and the feature 56 located within a predetermined distance along the route from the map DB 10 and sets the feature 55 having the bigger size as the target feature Ltag (see step S307). Then, at step S104, the autonomous driving control unit 18 changes the target track as indicated by the dashed line L2 so that the vehicle changes lanes from the center lane of the road to the left-side lane near the feature 55.

As explained above, the autonomous driving control unit 18 selects as the target feature Ltag such a feature having a large size (i.e., having a lot of points irradiated with the laser light by the lidar 2). Generally, at the time of determining the measurement position (measurement value Z) of the feature by the lidar 2, the number of samples used to calculate the centroid position increases with increasing number of points indicated by the point cloud data regarding the feature, which leads to determining the measurement position of the target feature with a high degree of accuracy. Thus, according to the example illustrated in FIG. 10, the autonomous driving control unit 18 selects, as the target feature Ltag, such a feature where a lot of points are gained as the point cloud data, therefore increasing the accuracy of the estimated position in the low positional accuracy direction Dtag as much as possible.

Figure 11:
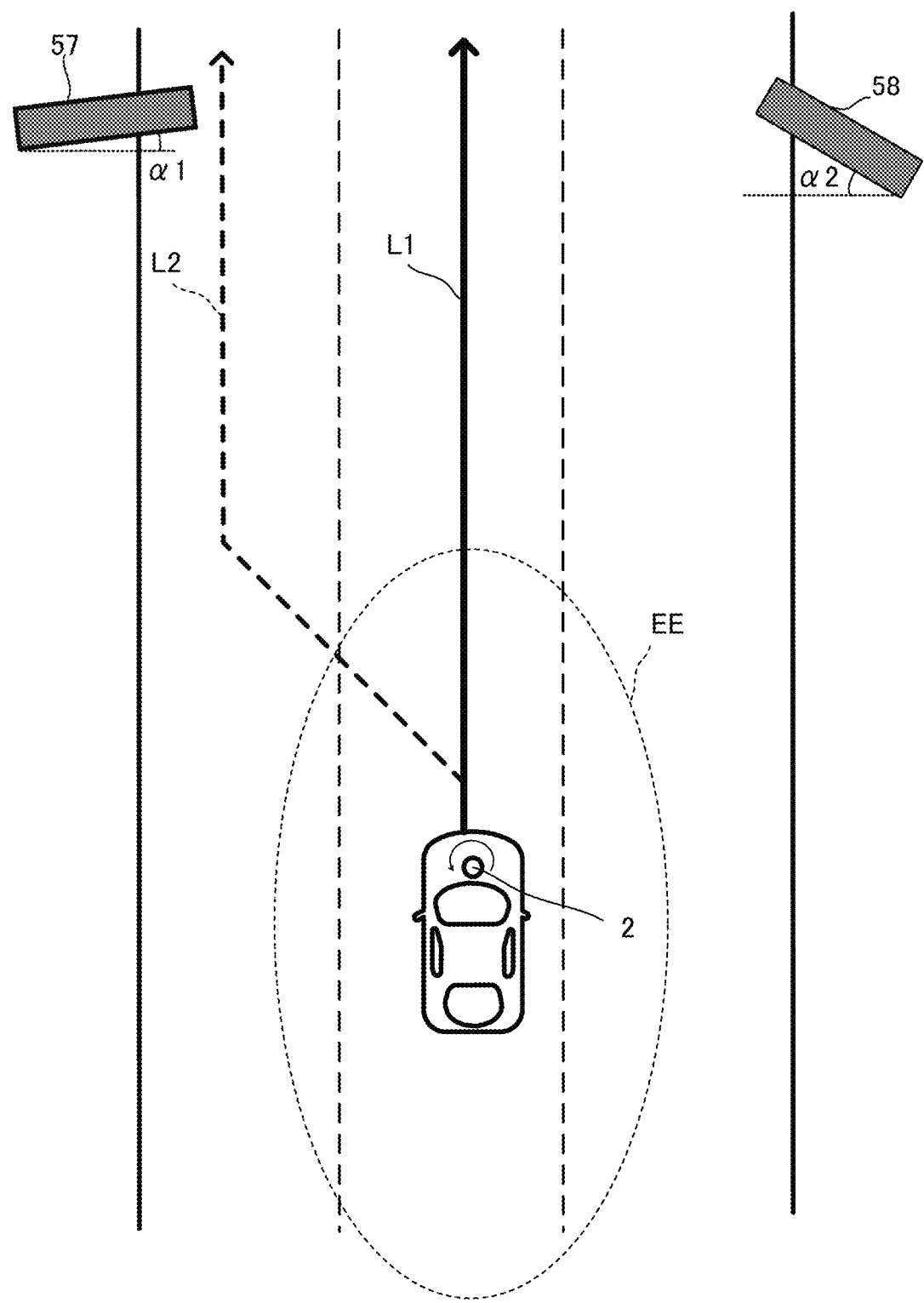
FIG. 11 illustrates a plane view of the vehicle in a case where there are features, on the left-front position and on the right-front position of a road, having different normal directions.

FIG. 11 illustrates a plane view of the vehicle in a case where there are a feature on the left front position of the road and a feature on the right front position thereof whose normal directions are different. According to this example, the feature 57 leans by the angle "α1" with respect to the lateral direction of the vehicle while the feature 58 leans by the angle "α2" which is larger than the angle α1 with respect to the lateral direction of the vehicle.

According to the example illustrated in FIG. 11, at step S102, the autonomous driving control unit 18 identifies the travelling direction of the vehicle as the low positional accuracy direction Dtag and, at step S103, determines that the normal directions of both of the feature 57 and the feature 58 are similar to the travelling direction that is the low positional accuracy direction Dtag. In this case, the autonomous driving control unit 18 refers to the suitability degree information corresponding to the features 57 and 58 from the map DB 10, and if the both of the suitability degree information indicates the same value or there is no suitability degree information corresponding to the features 57 and 58, the autonomous driving control unit 18 determines, as the target feature Ltag, the feature 57 situated along the route whose normal direction is most similar to the low positional accuracy direction Dtag (see step S304). Then, at step S104, the autonomous driving control unit 18 changes the target track as indicated by the dashed line L2 so that the vehicle changes lanes from the center lane of the road to the left side lane near the feature 55. In contrast, the autonomous driving control unit 18 refers to the suitability degree information corresponding to the features 57 and 58 from the map DB 10, and if the value indicated by the suitability degree information corresponding to the feature 58 is larger than the value indicated by the suitability degree information corresponding to the feature 57, the autonomous driving control unit 18 identifies the feature 58 as the target feature Ltag (see step S302 and step S305).

As described above, according to the example illustrated in FIG. 11, if there are multiple features having the normal directions similar to the low positional accuracy direction Dtag, the autonomous driving control unit 18 identifies, as the target feature Ltag, such a feature having the normal direction which is most similar to the low positional accuracy direction Dtag or corresponding to the suitability degree information indicative of the highest value. Thereby, it is possible to suitably increase the accuracy of the estimated position in the low positional accuracy direction Dtag.

As explained above, the autonomous driving control unit 18 of the onboard device 1 according to the onboard device 1 acquires the positional accuracies in the travelling direction and the lateral direction of the vehicle, respectively. With reference to the map DB 10, the autonomous driving control unit 18 acquires normal line information indicative of the orientation of each feature. The autonomous driving control unit 18 outputs, to an electronic control device of the vehicle, control information for controlling the vehicle to increase the detection accuracy of a target feature which faces a direction, either the travelling direction or the lateral direction of the vehicle, whichever positional accuracy is lower. Thereby, the onboard device 1 can suitably increase the positional accuracy in such a direction that the positional accuracy is low.

[Modifications]

Modifications suitable for the above embodiment will be described below. The following modifications may be applied to the embodiments in combination.

(First Modification)

Instead of the onboard device 1 storing the map DB 10 on the storage unit 12, a server device not shown may include the map DB 10. In this case, the onboard device 1 acquires necessary feature information by communicating with the server device through a communication unit not shown.

(Second Modification)

The low positional accuracy direction Dtag may not be limited to either the travelling direction of the vehicle or the lateral direction of the vehicle. Instead, for example, the autonomous driving control unit 18 may select, as the low positional accuracy direction Dtag, a direction, from predetermined two directions, in which the error range is larger. In another example, if a direction corresponding to the largest error range is not the travelling direction nor the lateral direction, the autonomous driving control unit 18 may determines the direction corresponding to the largest error range as the low positional accuracy direction Dtag.

(Third Modification)

The configuration of the driving support system illustrated in FIG. 1 is an example, and the configuration of the driving support system to which the present invention can be applied is not limited to such a configuration illustrated in FIG. 1. For example, instead of including the onboard device 1, the driving support system may let an electronic control device execute the processes to be executed by the own vehicle position estimation unit 17 and autonomous driving control unit 18 of the onboard device 1. In this case, for example, the map DB 10 is stored on the storage unit in the vehicle and the electronic control device of the vehicle may receive the update information regarding the map DB 10 from a server device not shown.

BRIEF DESCRIPTION OF REFERENCE NUMBERS

1 Onboard device
2 Lidar

3 Gyro sensor
4 Vehicle speed sensor
5 GPS receiver
10 Map DB

The invention claimed is:

1. An output device comprising:
a processor coupled to a memory storing instructions, the processor being configured to:
respectively acquire positional accuracies in a first direction and a second direction defined with respect to a travelling direction of a moving body;
acquire orientation information indicative of an orientation of each feature, the orientation information being included in map information;
determine a target feature, the target feature facing a direction, including one of the first direction or the second direction, which corresponds to a lower positional accuracy of the positional accuracies; and
output control information for controlling the moving body to increase a detection accuracy of the target feature.

2. The output device according to claim 1, wherein, if an angle defined by the direction which corresponds to the lower positional accuracy and the orientation of the each feature is equal to or smaller than a predetermined angle, the processor is configured to determine that the each feature faces the direction which corresponds to the lower positional accuracy.

3. The output device according to claim 1, wherein the map information includes information associated with a size of the each feature, and
wherein, if there is no feature which faces the direction corresponding to the lower positional accuracy, the processor is configured to determine, on a basis of the information associated with the size, the target feature whose detection accuracy is to be increased.

4. The output device according to claim 1, wherein the processor is further configured to:
acquire an output of a detection device which detects the each feature in surroundings of the moving body; and
estimate a position of the moving body based on the output regarding the target feature outputted by the detection device and position information regarding the target feature included in the map information.

5. The output device according to claim 1, wherein the processor is configured to output the control information:
for the moving body to move on a lane nearest to the target feature; or
for the moving body to move on a side near the target feature within a lane where the moving body is currently travelling.

6. The output device according to claim 1, wherein the processor is configured to select the target feature from the each feature situated along a route of the moving body.

7. The output device according to claim 1, wherein the processor is configured to select, from the each feature situated within a predetermined distance from the moving body as the target feature, such a feature with a smallest angle defined by the direction corresponding to the lower positional accuracy and the orientation of the each feature.

8. The output device according to claim 1, wherein the processor is configured to select, from the each feature situated within a predetermined distance from the moving body, the target feature based on:
angles defined by the direction corresponding to the lower positional accuracy and the orientation of each of the features; and
degrees of suitability of the each feature as a detection target by a detection device which detects the each feature in surroundings of the moving body.

9. The output device according to claim 8, wherein the processor is configured to select, as the target feature, a feature with the highest degree of the suitability from the each feature that angles defined by the direction corresponding to the lower positional accuracy and the orientation of the each feature is equal to or smaller than a predetermined angle.

10. A control method executed by an output device, the control method comprising:
respectively acquiring positional accuracies in a first direction and a second direction defined with respect to a travelling direction of a moving body;
acquiring orientation information indicative of an orientation of each feature, the orientation information being included in map information;
determining a target feature, the target feature facing a direction, including one of the first direction or the second direction, which corresponds to a lower positional accuracy of the positional accuracies; and
outputting control information for controlling the moving body to increase a detection accuracy of the target feature.

11. A non-transitory computer readable medium including instructions executed by an output device, the instructions comprising:
respectively acquiring positional accuracies in a first direction and a second direction defined with respect to a travelling direction of a moving body;
acquiring orientation information indicative of an orientation of each feature, the orientation information being included in map information;
determining a target feature, the target feature facing a direction, including one of the first direction or the second direction, which corresponds to a lower positional accuracy of the positional accuracies; and
outputting control information for controlling the moving body to increase a detection accuracy of the target feature.

* * * * *